United States Patent [19]

Kitade et al.

[11] Patent Number: 6,138,033
[45] Date of Patent: Oct. 24, 2000

[54] RADIO COMMUNICATION APPARATUS AND RADIO COMMUNICATION SYSTEM

[75] Inventors: Takashi Kitade, Machida; Kazuyuki Miya, Kawasaki, both of Japan

[73] Assignee: Matsushita Electric Industrial Co., Ltd., Osaka, Japan

[21] Appl. No.: 09/061,226

[22] Filed: Apr. 17, 1998

[30] Foreign Application Priority Data

Nov. 10, 1997 [JP] Japan ................................. 9-323818

[51] Int. Cl.$^7$ .............................................. H04B 7/05
[52] U.S. Cl. ................................................ 455/522; 455/69
[58] Field of Search ........................... 455/522, 69, 126, 455/127; 370/332, 328, 320, 318, 342; 375/200, 206

[56] References Cited

U.S. PATENT DOCUMENTS

| | | | |
|---|---|---|---|
| 5,267,262 | 11/1993 | Wheatley, III | 455/69 |
| 5,548,616 | 8/1996 | Mucke et al. | 455/127 |
| 5,553,316 | 9/1996 | Diepstraten et al. | 455/69 |
| 5,564,074 | 10/1996 | Juntti | 455/69 |
| 5,574,984 | 11/1996 | Reed et al. | 455/69 |
| 5,590,409 | 12/1996 | Sawahashi et al. | 455/69 |
| 5,627,857 | 5/1997 | Wilson | 375/219 |
| 5,665,021 | 9/1997 | Inoue | 476/4 |
| 5,839,056 | 11/1998 | Hakkinen | 455/69 |
| 5,852,782 | 12/1998 | Komatsu | 455/522 |
| 5,887,245 | 3/1999 | Lindroth et al. | 455/69 |
| 5,893,036 | 4/1999 | Trandai et al. | 455/522 |
| 5,943,610 | 8/1999 | Endo | 455/69 |
| 5,960,361 | 9/1999 | Chen | 455/522 |
| 5,963,870 | 11/1999 | Chheda et al. | 455/522 |
| 5,987,333 | 11/1999 | Sole | 455/522 |
| 5,991,636 | 11/1999 | Won et al. | 455/522 |

FOREIGN PATENT DOCUMENTS 7-235902   9/1995   Japan .
95/23460   8/1995   WIPO .

*Primary Examiner*—Nguyen Vo
*Assistant Examiner*—Duc Nguyen
*Attorney, Agent, or Firm*—Greenblum & Bernstein, P.L.C.

[57] ABSTRACT

When the transmission power of the radio transmission data is controlled in a given period in the transmission power control section of the radio communication apparatus, the transmission power value of this time is restricted to the value of the transmission power of the previous time added to said maximum allowance when the difference between the transmission power value of the previous time and the transmission power value of this time exceeds the maximum allowance in the situation where the transmission power is increased.

16 Claims, 7 Drawing Sheets

RADIO COMMUNICATION APPARATUS AND RADIO COMMUNICATION SYSTEM

BACKGROUND OF THE INVENTION

1. Field of the Invention

The present invention relates to a radio communication apparatus and a radio communication system which is effective for transmit power control in TDD (Time Division Duplex) transmission making a communication by time sharing of transmission-reception with the same frequency.

2. Description of the Related Art

There is a CDMA (Code Division Multiple Access) system available as a Multiple Access in which many communication stations mutually communicate by using a specific frequency band allotted. The CDMA is one of spread spectrum communications.

In the spread spectrum communication, a transmitting node multiplies information-modulated data by a so-called spreading code which is a code of fast rate than information data and transmits the spread data by spreading the spreading code into a wide bandwidth, while a receiving node multiplies a received spread data by the same spreading code on the same timing with the transmitting side.

The CDMA is an access method utilizing the spread spectrum communication wherein a different code is allotted to each user and the same frequency band width can be used by each user even between cells.

By the way, when the CDMA is used by a mobile communication, near far problem is arisen. When a plurality of the mobile stations transmit radio waves by the same transmission power to a base station, the radio waves from the station near to the base station are received in a large power as compared to a station far from the base station.

In the CDMA system, since the same frequency band is owned jointly by all users, the high power radio waves from the station near to the base station tend to cause a large interference to the radio waves from the station far from the base station. In order to accommodate effectively many users within the cells, it is necessary that a signal level arriving at the base station is made equal. One of the technological solutions for the near far problem as described above is to control the transmission power.

Further, as a problem particular to the mobile communication, there is a phenomenon called a fading. The fading is a phenomenon, wherein it is well known that the radio waves rarely arrive at the mobile station directly from the base station, but arrive in mutually interfered forms of many waves reflected, deflected and dispersed by surrounding buildings, etc. And therefore amplitude and phase of received signals are made to fluctuate at random.

Also, the changing speed of the received signals is in proportion to the speed of mobile. A transmission power control can follow up the fading of a certain speed.

Illustrated in FIG. 1 is a functional block diagram of the mobile station in TDD radio transmission system for making a conventional open loop type transmission power control. By the open loop type is meant a mode of making a communication wherein the mobile station voluntarily decides the transmission power to the base station.

This communication system comprises a frame assembly device 500 for framing a data to be transmitted, a modulator 501 for modulating the data, an amplifier 502 for amplifying modulated radio waves, a transmitting/receiving changing switch 503 for changing transmit-receive timing of the TDD, an antenna 504 for transmitting and receiving the radio waves, a demodulator 505 for demodulating a received data, a desired wave signal calculation device 506 for calculating a power of a desired wave signal (a desired wave signal at the time of an actual communication) from the demodulated data, a transmission power control device 507 for deciding a transmission power value of the mobile station, and a frame decomposition device 508 for taking out a data by decomposing the frame-composed data.

The action of the TDD radio transmission system as constituted above will be described in details as follows.

First, the radio waves received from the base station are received by the antenna 504 and input to the demodulator 505 via the transmitting/receiving changing switch 503. In the demodulator 505, the data is demodulated by assuming a propagation path and the demodulated data is input to the frame decomposition device 508 and the desired wave signal calculation device 506.

The frame composed data input to the frame decomposition device 508 is decomposed here and necessary components alone are taken out and output as received data.

On the other hand, in the desired wave signal calculation device 506, calculation of a received signal power is made and the calculated received power value is input to the transmission power control device 507.

In the transmission power control device 507, the transmission power value in the base station is memorized and a propagation loss from the base station to the mobile station is calculated from the transmission power value and the desired wave signal received power value. The transmission power value is represented by the value added with a target level in the base station (the level in which the base station can correctly receive radio waves) and the propagation loss. This transmission power value is calculated by the following expression $$PMS = PTG + (PBS - RMS) \text{ [dBm]} \qquad (1)$$

Note that PMS[dBm] is the transmission power value of the mobile station, PTG[dBm] is the target level in the base station, PBS[dBm] is the transmission power of the base station and RMS[dBm] is the desired wave signal received power. (PBS−RMS) is the propagation loss.

The radio waves modulated by the modulator 501 is amplified by the amplifier 502 into the transmission power value which is decided by the above described expression (1) and transmitted from the antenna 504 via the transmitting/receiving changing switch 503. Thus, the transmission power control is effected as above.

However, in the conventional radio transmission system, the received power of the desired wave signal can not be accurately measured if a signal to noise power ratio (SNR) or a signal to interference power ratio (SIR) is low in the mobile station. When the received power value of the desired wave signal is erroneously measured, there are cases where the transmission power is suddenly increased. Also in the case that a cellular telephone is adapted, the moment the mobile station moves into the shady side of buildings, a level of the received signal is suddenly increased. At this moment, there are frequent occasions when transmission is suddenly made with a big power and ,as a result, a big interference is caused to the radio waves of other users mobile stations.

SUMMARY OF THE INVENTION

The present invention is made in view of the above circumstances and it is the object of the present invention to provide the radio communication apparatus and the radio communication system which can prevent the transmission power from suddenly increasing or a big interference from being caused to other users when the received power of the desired wave signal from the other station is erroneously measured or when a level of the received signal is suddenly made small in one's own station.

The present invention provides the radio communication apparatus, comprising a transmission power control section for controlling the transmission power of a radio communication data at a prescribed period, an allowance storing section for storing a maximum allowance at one period, and a restricting section for restricting the transmission power value of this time to the value of the transmission power value of the previous time added to said maximum allowance in the situation when the difference between the transmission power value of the previous time and the transmission power value of this time exceeds the maximum allowance.

According to the present invention, when the measurement of the received power of the desired wave signal from the other station is greatly mistaken or even when the level of the received signal is suddenly made small, causing a big interference to other user can be prevented without suddenly increasing the transmission power.

Also, the present invention provides the radio communication apparatus, further comprising a function for measuring an interference situation with other station from a ratio of the desired wave signal to the interference power of the received signal received from other station and a function for adaptively controlling the maximum allowance according to the measured interference situation.

According to the present invention, how much the transmission power can be allowable as an interference amount given to other station is presumed from a presumed interference amount and can be reflected on the maximum allowance.

Also, the present invention provides the radio communication apparatus, further comprising a function for measuring fluctuation of the received level and a function for suitably changing the maximum allowance according to the measured received level.

According to the present invention, since the maximum allowance is suitably changed according to fluctuation of the measured received level, causing a big interference to other user can voluntarily be prevented.

Also, the present invention provides the radio communication apparatus, wherein the maximum allowance of the transmission power is stored in the allowance storing section separately according to the cases when the transmission power is increased and when the transmission power is decreased and a restriction is imposed to a change amount separately according to the cases when the restricting section increases or decreases the transmission power.

According to the present invention, when the transmission power having a possibility of causing an interference to other station is increased, the transmission power is given a restriction so as not to increase suddenly. When the transmission power having not a possibility of causing an interference is decreased, the transmission power can be dynamically controlled to a certain extent.

Also, the present invention offers the radio communication apparatus wherein the maximum allowance is instructed from other station.

According to the present invention, the base station calculates the interference with other mobile station and, by instructing the maximum allowance of the transmission power of the mobile station, can prevent causing an interference among other mobile stations, while watching the interference from other users.

Also, the present invention offers the method comprising a step for calculating the transmission power, a step for comparing a difference between the transmission power value of the previous time and the transmission power value of this time, and a step for restricting the transmission power value of this time to the value of the transmission power of this time added with the maximum allowance in the situation where the transmission power is increased when the difference between the transmission power value of the previous time and the transmission power value of this time exceeds the maximum allowance.

DESCRIPTION OF THE PREFERRED EMBODIMENT

Embodiment 1

Figure 1:
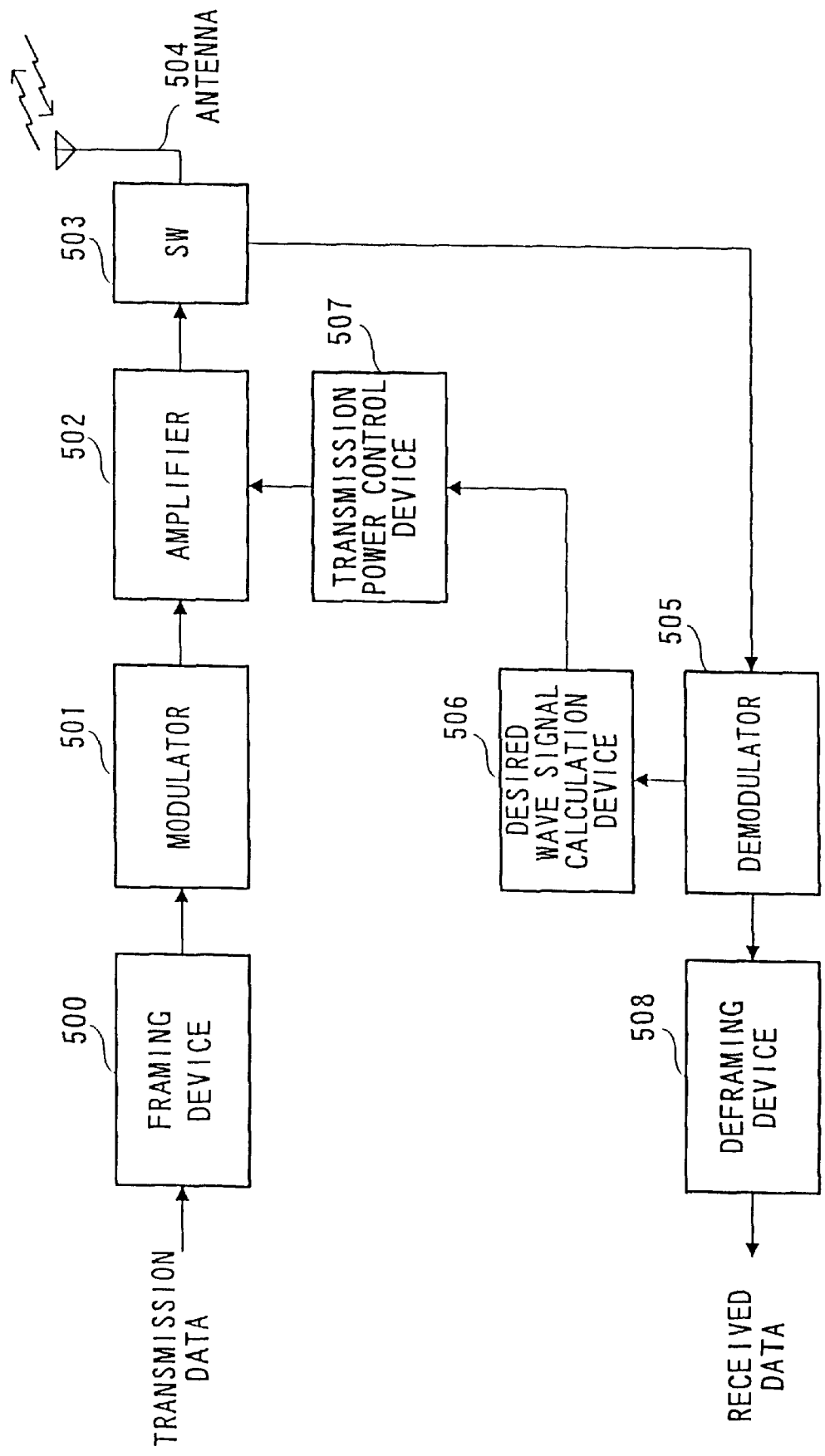
FIG. 1 is a block diagram of the conventional radio communication system.
Figure 2A:
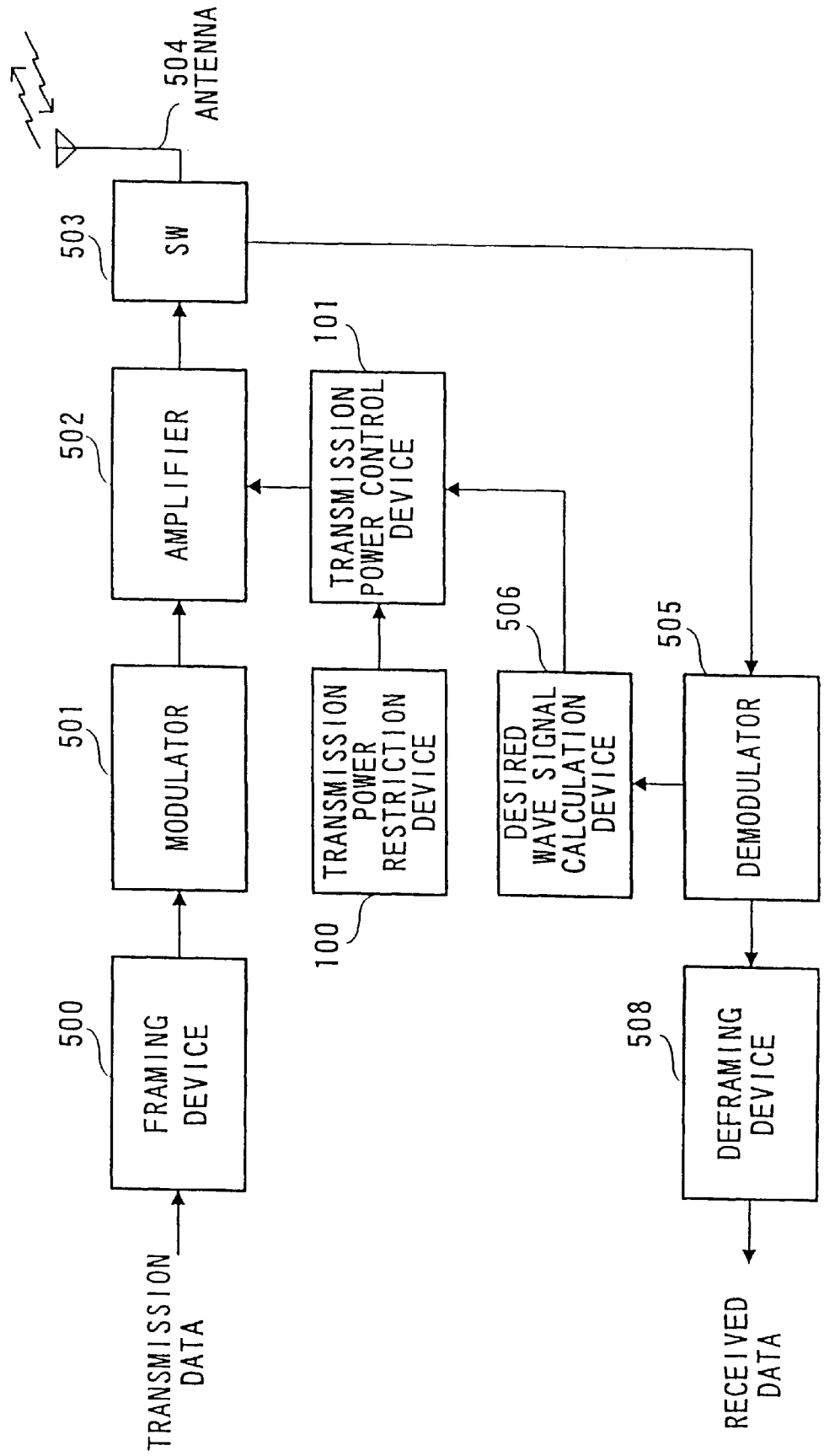
FIG. 2A is a block diagram of the radio communication system according to the first embodiment of the present invention.
Figure 2B:
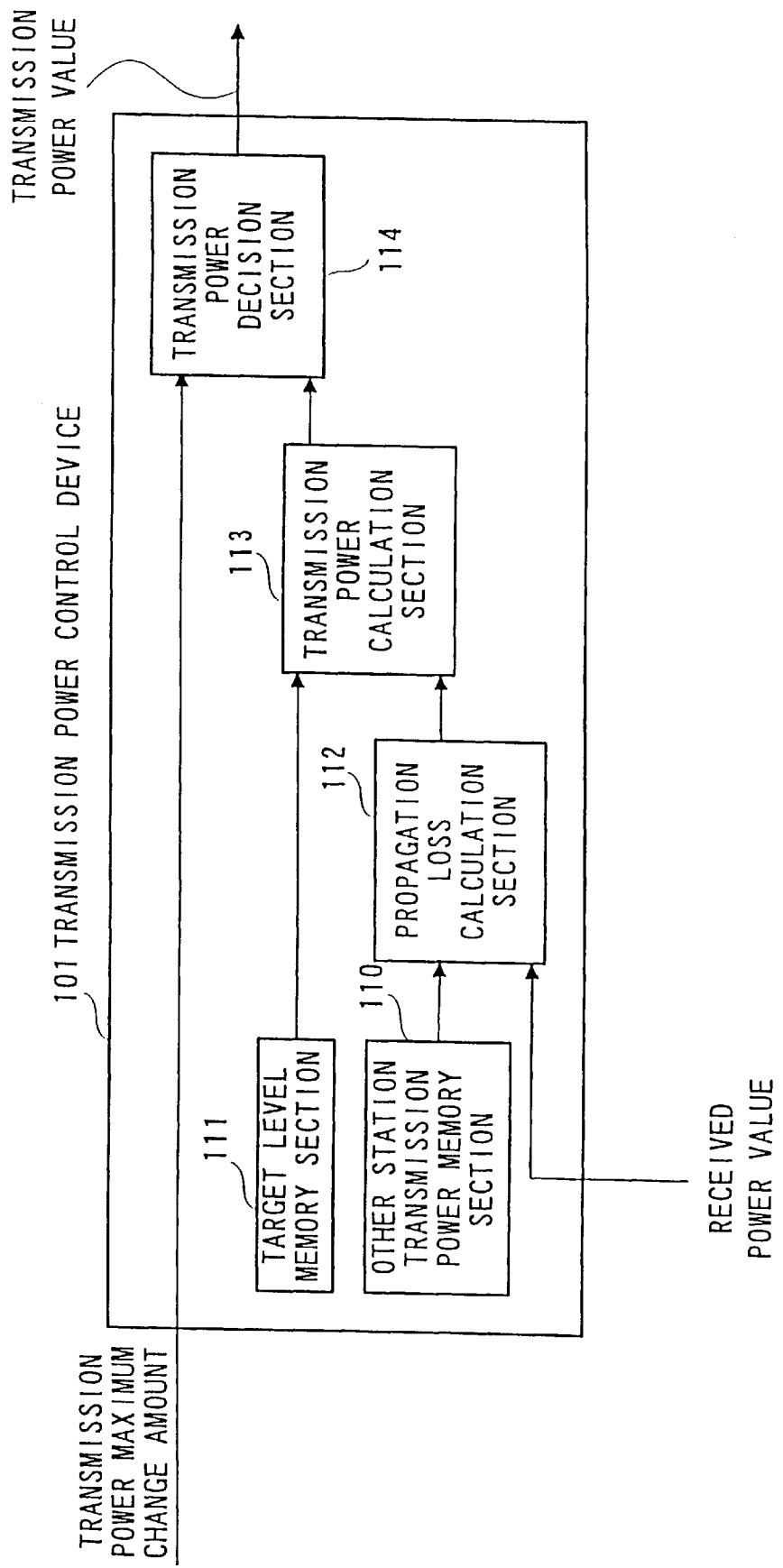
FIG. 2B is a block diagram of a transmission power control apparatus comprised in the radio transmission system according to the first embodiment.

Illustrated in FIG. 2A is a block diagram to show a mobile station in the radio communication system according to the first embodiment of the present invention. FIG. 2B is a block diagram of a transmission power control device 101 with which the mobile station is equipped. Note that the same sign is given to the section having the same function with each section of the device as shown in FIG. 1

In the mobile station as shown in FIG. 2A, a transmission power restriction device 100 for limiting a maximum change of transmission power is connected to the transmission power control device 101. As shown in FIG. 2B, the transmission power control device 101 is constituted by comprising the transmission power memory section 110 for memorizing the transmission power value of the other station (for example, a base station), a target level memory section 111 for memorizing a target level in the other station, a propagation loss calculation section 112 for obtaining a propagation loss from the other station in communication to this station by subtracting the transmission power of a desired wave signal calculated in a desired wave signal level calculation device 506 from a transmission power value memorized in the transmission power memory section 110, a transmission power calculation section 113 for obtaining a temporary transmission power value by adding the propagation loss to the target level memorized in the target level memory section 111, and a transmission power decision section 114 wherein the transmission power value of the previous time is compared to a temporary transmission power value and when the temporary transmission power value exceeds the transmission power value of the previous time and the difference thereof is larger than the maximum allowance output from the transmission power control device 100, the value of the transmission power of the previous time added with the maximum allowance is decided as the transmission power of this time and, when the difference thereof is small, the temporary transmission power value is decided as the transmission power value of this time.

In the constitution as described above, radio waves received by an antenna 504 from the base station (not shown in the drawing) are input to the demodulator 505 via a transmitting/receiving changing switch 503 for demodulating. The demodulated data is input to a deframing device 508 and a desired signal wave calculation section 506.

In the deframing device 508, a frame of the demodulated data is deframed and each data is taken out and output as a received data. In a desired wave signal calculation device 506, calculation of the received signal power of the desired wave signal is made and input to the transmission power control device 101.

Here, a maximum allowance of the transmission power changed in one duration for control the transmission power is output to the transmission power control device 101 from the transmission power restriction device 100 so as not to cause a sudden interference to other user's mobile station in the transmission power control device 101.

In the transmission power control device 101, the propagation loss from the other station in communication with this station is presumed.

The value of the propagation loss added to the target level on the base station is represented by a candidate of the transmission power value. In the case that the candidate of the transmission power value changes more than the maximum allowance input from the transmission power restriction device 100 as against the power value previously sent, the transmission power value obtained by adding the maximum allowance of variable transmission power of the previous time is represented by the transmission power value of this time and, in the case otherwise, the candidate of the transmission power value is input as it is to the amplifier 502 as the transmission power value of this time.

Here, a description will be made about a calculation control made by the transmission power control device 101 with reference to an expression as follows. First, let the target level in the other station be PTG(dBm), the transmission power value of the other station PBS (dBm), a received power of the desired wave signal in this station RMS(dBm), a restriction value of the maximum allowance of the transmission power changed in one period L(dB) and the transmission power of the station PMS(dBm). The transmission power control is given by the following expression (1), that is to say, $$PMS=PTG+(PBS-PMS)$$

Here, the propagation loss of (PBS−RMS) is represented by ΔP(dB) and the transmission power PMS(n−1) at a time point (n−1) is given by the following expression (2):

$$PMS(n-1)=PTG+\Delta P(n-1) \quad (2)$$

The candidate of the transmission power PMS(n) at the next time point n is given by the following expression (3):

$$PMS(n)=PTG+\Delta P(n) \quad (3)$$

Here, the following qualified expressions (4) and (5) are considered:

$$[PMS(n)-PMS(n-1)]<L \quad (4)$$

$$[PMS(n)-PMS(n-1)]\geq L \quad (5)$$

The transmission power on the conditions of the expression (4) is given by the following expression (6):

$$PMS(n)=PTG+\Delta P(n) \quad (6)$$

The transmission power on the conditions of the expression (5) is given by the following expression (7):

$$PMS(n)=PMS(n-1)+L \quad (7)$$

When PTG does not change, conditional expressions (4) and (5) may be given by (8) and (9):

$$[\Delta P(n)-\Delta P(n-1)]<L \quad (8)$$

$$[\Delta P(n)-\Delta P(n-1)]\geq L \quad (9)$$

However, there are occasions when PTG and PBS change time-wise. In that case, the transmission power value is decided by the conditional expressions (4) and (5).

By the transmission power value thus decided as above, the amplifier 502 amplifies a signal which is input from the modulator 501 and the amplified signal is transmitted from the antenna 504 via the transmitting/receiving changing switch 503.

Note that FIG. 2A was described as the constitution of the mobile station, but it can be applied to the constitution of the base station as well.

Thus, according to the first embodiment, in the radio transmission system for making the transmission power control of the open loop type through the TDD transmission, the maximum allowance of the transmission power of the station in a period of the transmission power control is set up by the transmission power restriction device 100 and, after the transmission power value of the station is temporarily obtained by the transmission power control device 101, a comparison is made between the maximum allowance of the transmission power and the temporary transmission power value. And when the difference thereof is more than the maximum allowance, the transmission power control is made by the transmission power value where the maximum allowance is added to the transmission power of the previous time. Therefore, in one's own station, if the measurement value of the transmission power of the desired wave signal from the other station is greatly mistaken or if a level of the received signal is suddenly made small, giving a big interference to other user can be prevented without causing a sudden increase of the transmission power.

Embodiment 2

Figure 3A:
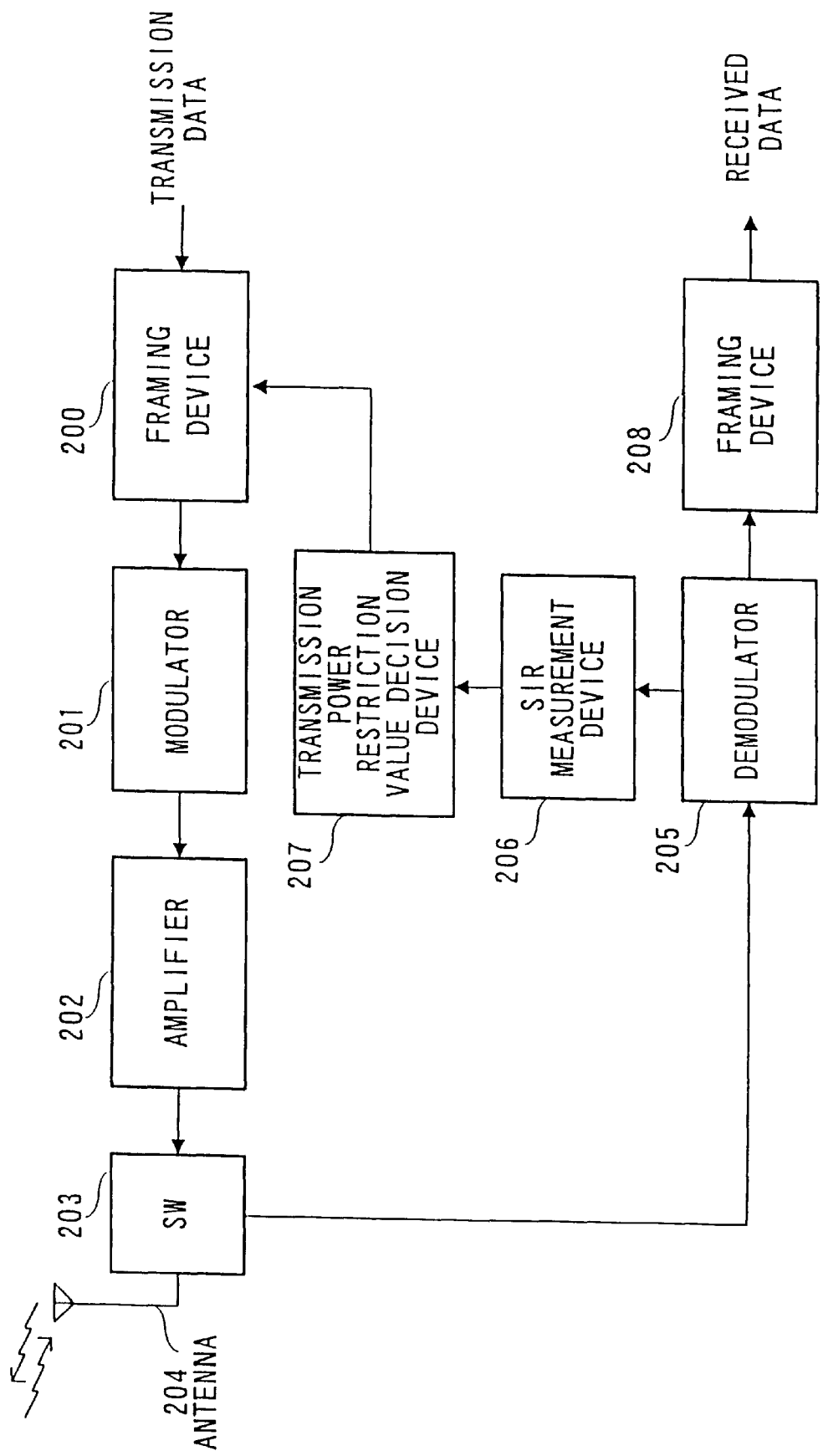
FIG. 3A is a block diagram of the base station in the radio transmission system according to the second embodiment of the present invention.
Figure 3B:
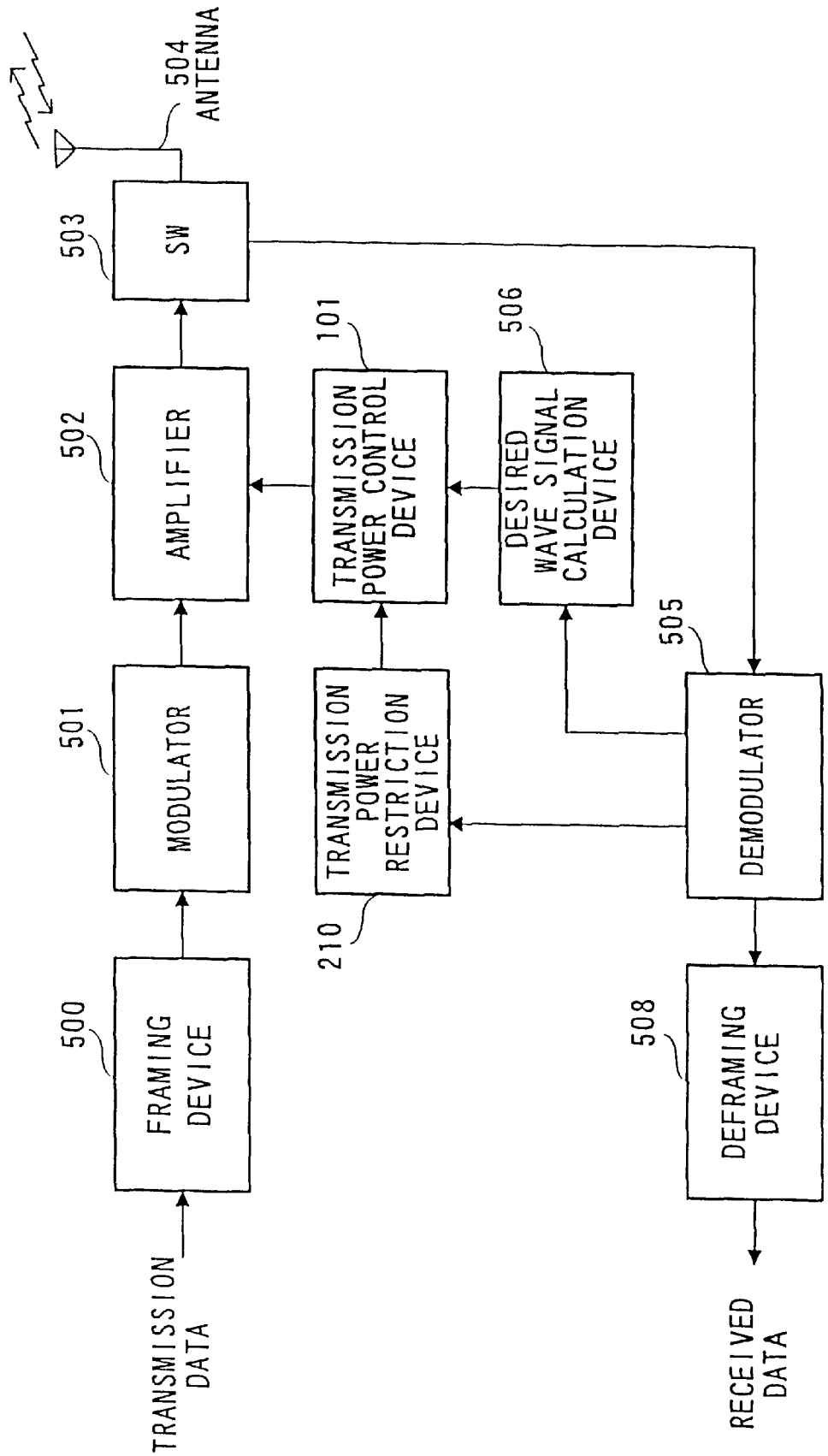
FIG. 3B is a block diagram of a mobile station in the radio transmission system according to the second embodiment.

Illustrated in FIG. 3A is a block diagram of a base station in the radio transmission system according to the second embodiment of the present invention. FIG. 3B shows a block diagram of a mobile station in the radio transmission system. Note that the same sign is given to the section having the same function with each section of the first embodiment as shown in FIG. 2.

The base station as shown in FIG. 3A comprises a framing device 200 for composing a transmitting data into a data of a frame unit, a modulator 201 for modulating the framed data, an amplifier 202 for amplifying a power of modulated wave, a switch 203 for changing transmission and reception, an antenna 204 for transmission and reception, a demodulator 205 for demodulating a received data, a SIR measurement device 206 for measuring a ratio of the desired wave signal and the interference power (SIR), a transmission power restriction value decision device 207 for deciding a restriction value of the maximum allowance of the transmission power of the transmission power control by a result of SIR, and a deframing device 208 for taking out a data from the frame composed data.

The characteristics of the base station as constituted above according to the second embodiment of the present invention is that the maximum allowance of the transmission power in the transmission power control is decided on the basis of the result of SIR by the transmission power restriction value decision device 207 and this maximum allowance is transmitted to the mobile station.

The characteristics of the mobile station as shown in FIG. 3B is that the maximum allowance transmitted from the base station is demodulated by the demodulator 505 and output to the transmission power restriction device 210 and the transmission power restriction device 210 sets the maximum allowance of the transmission power of one's own station changed at one period for the power control and outputs the set up maximum allowance to the transmission power control device 101.

The action of the base station and the mobile station constituted as above will be described in details as follows.

First, in the base station when radio waves are received by the antenna 204 from the mobile station, the radio waves are input to the demodulator 205 via the transmitting/receiving changing switch 203. The data demodulated by the demodulator 205 is input to the SIR measurement device 206 and here the SIR in relation to the user is measured.

The value of the measured SIR is input to the transmission power restriction value decision device 207. In the transmission power restriction value decision device 207, when the SIR is low against a target power in the base station, it is assumed that the situation has arisen where an interference from other user is much and when the SIR is high, it is assumed that the situation has arisen where the interference from other user is little. Consequently, by assuming to what extent the transmission power of the mobile station constituting an interference component to other user can be allowed, the maximum allowance of the transmission power changed at one control period is decided.

Note that, though the interference amount from other user is assumed here on the basis of the result of the SIR, the interference amount may be assumed on the basis of a traffic amount recognized by the base station and the maximum allowance of the transmission power changed at one control period may be decided.

That is to say, if the measured SIR is represented by SIRM[dB] and a threshold level value of the SIR by SIRTH*[dB], the following expressions are given to decide the transmission power control value L*[dB]:

When SIRTH1≦SIRM<SIRTH2, L1
When SIRTH2≦SIRM<SIRTH3, L2
:
When SIRTHn≦SIRM<SIRTHn+1, Ln Thus, the transmission power restriction value L*[dB] is decided.

This information about L* is put on a control channel and frame-assembled by the framing device 200 and transmitted via the demodulator 201, the amplifier 202, the transmitting/receiving changing switch 203 and the antenna 204.

In the mobile station, the radio waves received by the antenna 214 are input to the demodulator via the transmitting/receiving changing switch 213 and here the maximum allowance transmitted from the base station is demodulated.

In the transmission power restriction device 210, the maximum allowance of the transmission power changed in one control period is decided on the basis of the transmission power restriction value and is output to the transmission power control device 101. In the transmission power control device 101, similar to the first embodiment, the maximum allowance of the transmission power is restricted and the transmission power is decided and the sending control is made.

Note that, according to the second embodiment, FIG. 3A is described as the constitution of the base station and FIG. 3B as the constitution of the mobile station, but the constitution thereof may be reversed with each other.

In this manner, according to the second embodiment, the mobile station in the radio transmission system making the transmission power control of the open loop type through the TDD transmission comprises the transmission power restriction device 210 for learning from the base station the instruction of the maximum allowance of the transmission power of the mobile station in the control period of the transmission power and the transmission power control device 101 for deciding the transmission power value on the basis of the maximum allowance from the transmission power restriction device 210, while the base station comprises the transmission power restriction value decision device 207 for instructing the maximum allowance of the transmission power in the control period of the transmission power control and, upon calculating the interference between the mobile station and other user in the base station, instructs the maximum allowance of the transmission power of the mobile station in the control period of the transmission power control of each station, thereby preventing the interference given among each station, while watching the interference from other user.

Embodiment 3

Figure 4:
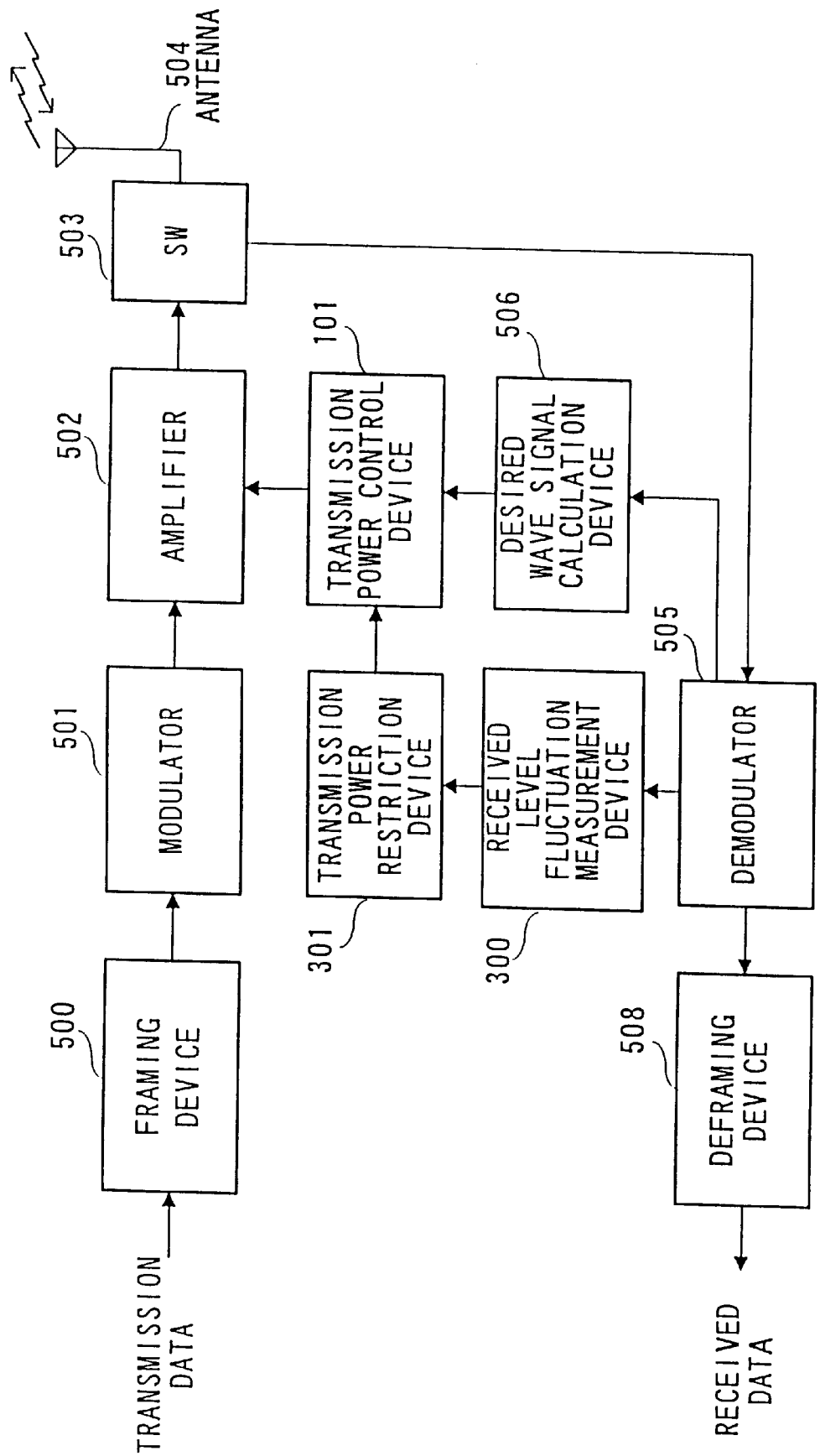
FIG. 4 is a block diagram of the radio transmission system according to the fourth embodiment of the present invention.

FIG. 4 shows a block diagram of the mobile station in the radio transmission system according to the third embodiment of the present invention. Note that the same sign is given to the section corresponding to each section of the first embodiment as shown in FIG. 2 in the third embodiment as shown in FIG. 4 and the description thereof will be omitted accordingly.

The characteristics of the mobile station as shown in FIG. 4 is that fluctuation of a received level is measured in a received level fluctuation measurement device 300 and a transmission power restriction device 210 suitably changes and sets the maximum allowance of the transmission power of the station according to fluctuation of the received level previously measured, thereby the set up maximum allowance is output to a transmission power control device 101.

The action of the mobile station constituted as above will be described in details as follows. The radio waves from the base station are received by an antenna 504 and input to a demodulator 505 via a transmitting/receiving changing switch 503. In a received level fluctuation measurement device 300, a doppler frequency fD of a fading is estimated from fluctuation of the received level. Note that the received level fluctuation measurement device here is one example of assuming the doppler frequency and other means may be used if the similar one corresponding to the doppler frequency can be measure.

Whether the control period T of the transmission power control could be followed up is assumed by deciding to what extent the transmission power is changed. Therefore, if the maximum allowance is represented by L(dB), on the basis of the following expression (10), $$L = g(fD, T) \qquad (10)$$

a transmission power restriction device 301 decides the maximum allowance L. Here, the function g(x, y) is the function for deciding to what extent the transmission power should be changed so as to follow up the doppler frequency per one control period. This maximum allowance is input to the transmission power control device 101 and decides the transmission power in the similar manner to the first embodiment.

Note that, in the above, FIG. 4 is described as the constitution of the mobile station, but this constitution can be applied to the base station as well.

In this manner, according to the third embodiment, the fluctuation of the received level is measured by the received level fluctuation measurement device 300 and the transmission power restriction device 210 suitably changes and sets the maximum allowance of the transmission power of one's own station changed in one control period according to the fluctuation of the received level previously measured and the set up maximum allowance is output to the transmission power control device 101 and the transmission power is decided, thereby a big interference given to other user can be prevented.

Embodiment 4

Figure 5:
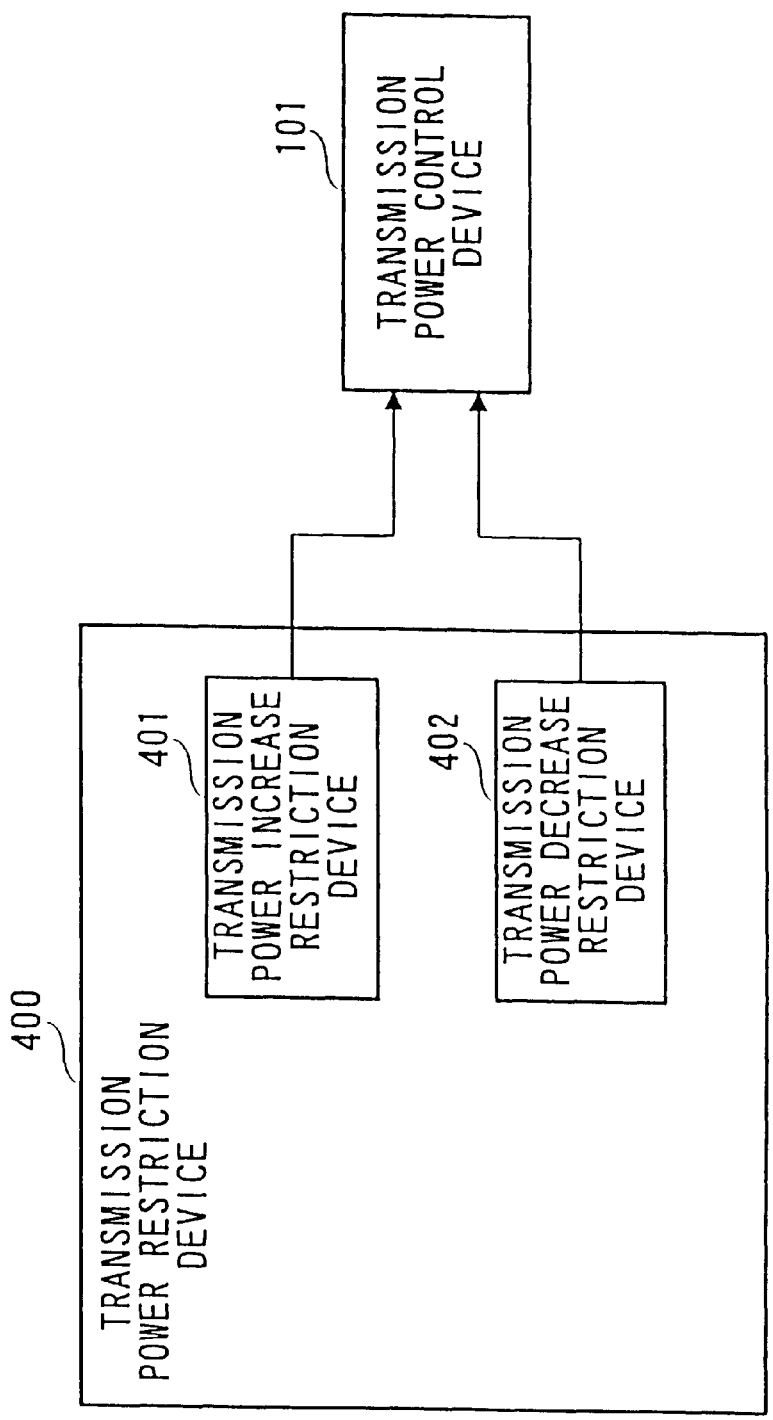
FIG. 5 is a block diagram of the transmission power restricting device in the radio transmission system according to the fourth embodiment of the present invention.

Illustrated in FIG. 5 is a block diagram of a transmission power control device according to the fourth embodiment of the present invention.

The transmission power control device 400 as shown in FIG. 5 conforms to either one of the transmission power control devices as shown in FIG. 2 to FIG. 4 with the signs 100, 210 and 301.

The transmission power restriction device 400 imposes a restriction to the maximum allowance of the transmission power at the time of an open loop transmission power controlling and comprises a transmission power increase restriction device 401 for imposing a restriction when the transmission power is increased and a transmission power decrease restriction device 402 for imposing a restriction when the transmission power is decreased.

The action of the transmission power control device constituted as above will be described in details as follows. In the transmission power control device according to the embodiments from 1 to 3, the maximum control amount in the control period of the transmission power was the same in whichever cases the transmission power was increased or decreased.

However, in case of a transmission power restriction device 400, when the transmission power is increased, it is made not increased more than the transmission power value specified by a transmission power increase restriction device 401 and, when decreased, not decreased less than the transmission power value specified by a transmission power decrease restriction device 402 so that the transmission power set up separately by the restriction is input to the transmission power control device 101.

Here, let the upper limit of the maximum allowance of the transmission power be represented by the LUP and the lowest limit by LDOWN. If the transmission power PMS (n−1) of the station at a time point n−1 is given by the following expression (11), $$PMS(n-1) = PTG + \Delta P(N-1) \qquad (11)$$

and the candidate of the transmission power of the station at a time point n is given by the following expression (12), $$PMS(n) = PTG + \Delta P(n) \qquad (12)$$

$$\text{then } \Delta P(n) - \Delta P(n-1) > LUP \qquad (13)$$

The transmission power of the above (13) can be given by the following expression (14), $$PMS(n) = PMS(n-1) + LUP \qquad (14)$$

$$\text{while } \Delta P(n) - \Delta P(n-1) < LDOWN \qquad (15)$$

The transmission power of the above (15) can be given by the following expression (16):

$$PMS(n) = PMS(n-1) + LDOWN \qquad (16)$$

Consequently, the transmission power under the following condition (17) can be given by the following expression (18):

$$LDOWN < \Delta P(n) - \Delta P(n-1) < LUP \qquad (17)$$

$$PMS(n) = PTG + \Delta P(n) \qquad (18)$$

Thus, as above, the transmission power is controlled.

In this manner, according to the fourth embodiment, the transmission power restriction device 400 is provided for setting up a restriction separately to the transmission power when the transmission power is increased or when the transmission power is decreased in relation to the maximum allowance in the control period of the transmission power and when the transmission power capable of giving the interference to other user is increased., the transmission power is restricted so as not to increase suddenly or when the transmission power not capable of giving the interference is decreased, a restriction is separately set up so that the transmission power can be controlled to a certain extent, thereby a big interference given to other user can be prevented.

It is to be noted that all the embodiments from 1 to 4 as described above can be practiced in TDMA (Time Division Multiple Access) and CDMA (Code Division Multiple Access).

What is claimed is:

1. A radio communication apparatus that performs open loop type transmission power control in a radio communication system with a TDD system, the radio communication apparatus comprising:

transmission power control means for controlling a transmission power of a radio transmission signal in a given period;

allowance storing means for storing a maximum allowance of the transmission power in one period; and restriction means for restricting the transmission power value in present time to a sum of the transmission power value in previous time and the maximum allowance only when the difference between the transmission power value in the previous time and the transmission power value in the present time exceeds said maximum allowance in the situation where the transmission power is increased.

2. The radio communication apparatus according to claim 1, further comprising;
   means for measuring an interference with other communication station from a ratio of a desired wave signal to an interference transmission power of a received signal received from other communication station, and
   means for adaptively controlling said maximum allowance according to the measured interference.

3. The radio communication apparatus according to claim 1, further comprising;
   means for measuring fluctuation of a received level of a receiving signal, and
   means for adaptively changing said maximum allowance according to the measured received level.

4. The radio communication apparatus according to claim 1, wherein said allowance storing means stores the maximum allowance of the transmission power separately according to the cases where the transmission power is increased and where the transmission power is decreased, and
   said restriction means imposes restriction to a change amount of the transmission power separately according to the cases when the transmission power is increased and when the transmission power is decreased.

5. The radio communication apparatus according to claim 4, where in the maximum allowance corresponding to the case where the transmission power is decreased is relatively larger than the maximum allowance according to the case where the transmission power is increased.

6. The radio communication apparatus according to claim 1, wherein the maximum allowance stored in said allowance storing means is instructed from other communication station.

7. A mobile station having the radio communication apparatus as described in claim 1.

8. A base station performing the radio communication with the mobile station as claimed in claim 7, comprising
   allowable decision means for deciding the maximum allowance of said mobile station on the basis of communication environment, and
   means for performing radio transmission of the decided maximum allowance to said mobile station.

9. The base station according to claim 8, wherein said allowance decision means comprises
   means for measuring a ratio of the desired wave signal to the interference power regarding said mobile station from the received data received from said mobile station, and
   means for calculating the maximum allowance of said mobile station on the basis of the measured ratio of the desired wave signal to the interference power.

10. A radio communication system, comprising a base station and the mobile station as claimed in claim 7 for performing the radio communication with the base station.

11. A base station having the radio communication apparatus as claimed in claim 1.

12. The radio communication apparatus according to claim 1, further comprising:
    first calculation means for calculating the propagation loss by subtracting the power of a signal received from a communication station in present time from the transmission power of said communication station in the present time; and
    second calculation means for calculating a temporary transmission power by adding said propagation loss to a target level,
    wherein the transmission power in the present time is set to the sum of the transmission power in previous time and said maximum allowance when the difference between said temporary transmission power and the transmission power in the previous time is not less than said maximum allowance, and
    wherein the transmission power in the present time is set to the sum of said target level and said propagation loss when the difference between said temporary transmission power and the transmission power in the previous time is less than said maximum allowance.

13. An open loop type transmission power control method in a radio communication system with a TDD system, the method for controlling the transmission power of a radio communication apparatus, comprising:
    calculating the transmission power;
    comparing the difference between the transmission power value in previous time and the transmission power value in present time; and
    restricting the transmission power value in the present time to a sum of the transmission power value in the previous time and the maximum allowance only when the difference between the transmission power value in the previous time and the transmission power value in the present time exceeds the maximum allowance in the situation where the transmission power is increased.

14. The method according to claim 13, further comprising measuring fluctuation of a received level, and adaptively changing said maximum allowance according to the measured received level.

15. The method according to claim 13, wherein restriction is imposed to fluctuating amount of the transmission power separately in the cases where the transmission power is increased and where decreased.

16. A radio communication apparatus that performs open loop type transmission power control in a radio communication system with a TDD system, the radio communication apparatus comprising:
    a transmission power controller that estimates a present temporary transmission power in accordance with a reception power;
    an allowance memory that stores a maximum allowance, which is a reference value indicating a maximum increment amount of a transmission power in one period;
    a transmission power decision section that compares the present temporary transmission power with the previous transmission power and sets a present transmission power to a sum of a previous transmission power and the maximum allowance only when the difference between the previous transmission power and the present temporary transmission power exceeds the maximum allowance and the present temporary transmission power is increased from the previous transmission power.

* * * * *